United States Patent
Zickell et al.

(10) Patent No.: US 8,496,196 B2
(45) Date of Patent: Jul. 30, 2013

(54) ASPHALT MATERIAL RECYCLING SYSTEM AND METHOD

(75) Inventors: Robert Zickell, Winchester, MA (US);
Thomas J. Zickell, New Castle, NH (US)

(73) Assignee: Recycled Asphalt Shingle Technology, Brentwood, NH (US)

( * ) Notice: Subject to any disclaimer, the term of this patent is extended or adjusted under 35 U.S.C. 154(b) by 284 days.

(21) Appl. No.: 12/845,179

(22) Filed: Jul. 28, 2010

(65) Prior Publication Data
US 2011/0049275 A1    Mar. 3, 2011

Related U.S. Application Data

(60) Provisional application No. 61/230,426, filed on Jul. 31, 2009.

(51) Int. Cl.
*B02C 19/00* (2006.01)

(52) U.S. Cl.
USPC ............................ 241/65; 241/152.2; 241/200

(58) Field of Classification Search
USPC ................. 241/200, 152.2, 65, 66, 67, 38, 21, 241/23
See application file for complete search history.

(56) References Cited

U.S. PATENT DOCUMENTS

| | | | | |
|---|---|---|---|---|
| 4,706,853 | A | * | 11/1987 | Stonesifer et al. ............ 222/391 |
| 5,938,130 | A | * | 8/1999 | Zickell ............................ 241/65 |
| 8,177,152 | B2 | * | 5/2012 | Harmon .......................... 241/65 |

* cited by examiner

*Primary Examiner* — Mark Rosenbaum
(74) *Attorney, Agent, or Firm* — Bourque and Associates, PA

(57) ABSTRACT

An asphalt roofing material recycling system and method is used to recycle new and used (post consumer) asphalt materials, such as asphalt shingles, rolled roofing and tar paper that may include granules, fibers or other particles. The asphalt material, which may be in bundles, is broken up and separated and then provided to a cooled recycling vessel. Dry ice is added along with the asphalt material to be recycled. The dry ice removes any moisture present and super-cools the material making it brittle and easier to chip and break up. The recycle vessel includes a number of high speed shippers having tulip hear chipping teeth as well as one horizontal mixer element which stirs the material and makes sure all material is ground. The resulting course to fine powder can be separated by screening and stored as power or compressed into bricks or briquettes.

12 Claims, 4 Drawing Sheets

ASPHALT MATERIAL RECYCLING SYSTEM AND METHOD

CROSS-REFERENCE TO RELATED APPLICATIONS

This application claims priority to U.S. Provisional Patent Application No. 61/230,426 filed on Jul. 31, 2009 entitled "Asphalt Material Recycling System and Method" which is incorporated fully herein by reference.

FIELD OF THE INVENTION

This invention relates to a recycling system and method and in particular, to a system and method of recycling granular and non-granular coated asphalt material such as new and used roofing shingles.

BACKGROUND OF THE INVENTION

Roofing shingles are traditionally manufactured utilizing asphalt, which is derived from crude oil. Asphalt prices have recently increased even more rapidly than crude oil prices. In addition to the use and cost of crude oil in the asphalt manufacturing process, the process of manufacturing asphalt shingles further utilizes a considerable amount of fossil fuels heating both the asphalt and the fillers so that they can be combined. Typically, approximately 65% filler is mixed with approximately 35% asphalt. In order to create a mixture having a usable viscosity, the asphalt is heated to 450° F. while the filler is heated to approximately 350° F. prior to the two additives being mixed together.

Considerable waste is involved with the manufacture and use of asphalt roofing materials, such as shingles and roll roofing membranes. For example, each new asphalt roofing shingle has cutout tabs that are removed and discarded (this waste will be called "manufacturer's asphalt roofing shingle waste") while old shingle materials removed from existing buildings (this waste will be called "post consumer asphalt shingle waste") also adds to a significant amount of roofing material waste. In the US alone, 11 million tons of post consumer asphalt shingles are removed from roofs annually. Approximately 10 million of these tons are buried in landfills. Not only are landfill costs increasing, but access to landfills for recyclable products is becoming more restricted since roofing shingles are products which do not degrade. Asphalt shingles pose an additional particular problem to landfills because they restrict natural water movement causing delays with the natural decay of other items in the landfill. The asphalt shingles themselves do not degrade and stay permanently in the landfill.

Recycling of all types of roofing material waste has been discussed and attempted but has not been terribly successful. The waste generated from asphalt roofing materials presents a significant recycling as well as environmental concern because of the composition of the roofing material. Typical shingles are composed of a cellulose fiber saturated with asphalt or fiberglass mat, an asphalt coating on the mat, and granules disposed on the coating. Such materials are difficult to break down and have typically required complex recycling processes.

Past attempts at recycling asphalt shingles have failed to reduce the shingle granules to a size small enough for the recycled shingle material to be reused. If the granules in the recycled shingle material are not reduced to a fine powder, the granules will not remain suspended in an asphalt solution and the recycled shingle material cannot be reused in roofing or other products. Too fine of a granule also poses a problem in that the fine material does not have a significant use and is therefore not sellable.

Some past methods of recycling asphalt roofing material have used milling machines, such as rolling mills, bag mills, hammer mills, saw mills, etc. to produce a recycled roofing material which can be used only in road construction or as other similar "filler" material. However, merely milling the shingle material in a reduction mill without further processing has been unsuccessful in reducing the granules in the shingle material to a fine mesh so that the recycled asphalt can be reused in manufacturing new roofing products.

Asphalt roads are comprised of six percent paving grade asphalt and ninety-four percent aggregate. The particle size distribution is very specific and is carefully monitored by state and federal agencies. Attempts to use post factory and post consumer shingles have been stopped by four major issues. First, ⅜ inch chips (the standard currently in use) will not dissolve in the mixing process, so little asphalt is freed up for incorporation into the road (the entrained mix energy is lost) which causes the amount of asphalt and mineral to be inconsistent. Second, the plastic Mylar on the back of all shingles is left as 4-5 inch by 1 inch pieces. Third, the nails may not be removed and fourth, the shingles contain too many fines. All of these issues create their own series of problems in recycling the materials for reuse. Nails cannot be present in the recycled material that is to be used, as nails in a road would pose serious problem. Likewise, the presence of fines in pavement creates air pockets and voids that affect the HMA performance in terms of rutting and cracking. Shingles contain 30-40 percent fines and the amount of fines needs to be reduced as low as possible because the fines increase viscosity causing more roller energy to be required (more passes over the pavement while hot) and they can have serious road quality implications. A new process is needed that resolves all of these issues.

One such apparatus for recycling roofing shingles is disclosed in U.S. Pat. No. 4,706,893 to Brock. This apparatus includes a hammer mill that comminutes the shingles and a vessel that subsequently dries then mixes the recycled shingle material with liquid asphalt, for recycling as an asphalt paving composition. This milling process will not reduce the granules in the shingle material to a small enough size for the shingle material to be reused in applications other than an asphalt paving composition. Moreover, portions of the recycled material that is too fine is considered "fines" in the paving industry and are unwanted in that they significantly increase the viscosity of the paving mixture and must be washed off or takes significantly more time to pack down.

Another shingle reducing apparatus is disclosed in U.S. Pat. No. 5,385,426 to Omann. This complex apparatus includes a shredder, two hammer mills, and two heated vessels for drying the shingle material after it has been reduced. This apparatus further requires spraying the shingles with water prior to entering the first hammer mill. This extremely complex and involved process requiring two hammer mills also is not capable of completely reducing the granules in the recycled shingle material to a fine mesh or powder.

One reason milling machines have been unsuccessful in reducing the granules in the recycled shingle material is because the shingle material was not heated as it was milled. In the past, heating the milling machine as the shingle material is milled was considered hazardous because of pressure build up in the closed milling vessel or heating vessel as a result of moisture in the shingle material. Heating would also make hammer mills gum up and not work because the asphalt would become sticky.

SUMMARY OF THE INVENTION

Accordingly, the present invention provides an asphalt material recycling apparatus and method that is capable of recycling asphalt shingle material and reducing granules, cellulose fibers, fiberglass fibers and other particles in the asphalt shingle material to a course to fine mesh powder that can be either used along with liquid asphalt or used in a dry form for various purposes.

The preferred method of recycling asphalt material includes cryogenically milling the asphalt material in an apparatus that can be sufficiently super-cooled such that the asphalt material to be recycled is essentially chipped, shredded and broken down into fine particles for further use in various processes such as the manufacture of asphalt shingles or roadway asphalt mixture.

Cryogenic processing can be accomplished using any of the previously mentioned media containing mills. Either the mill is cooled or the material is cooled before entering the mill or while in the mill. Cold grinding is preferred even though the mechanical energy used to grind becomes heat, which must be overcome with cooling energy. The paving industry requires a coarser grind than roofing materials because the fine particles interfere with the compaction process. This is due to the increase in asphalt viscosity that occurs with the introduction of particles of 200 mesh or finer. The cold grinding process lends itself to a coarser grind because the process can be stopped and the material tested very rapidly using screens to ascertain the particle size distribution. Hot asphalt testing requires a lengthy process of removing the asphalt with solvents, drying the remaining particles and then screening. Typically, this would take longer than the grinding cycle. The cold grind process produces a powder (almost like gun or black powder) that can be easily stored outside and conveyed into the paving process without modifying the typical paving plant equipment. This convenience is important to the marketability of the product.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
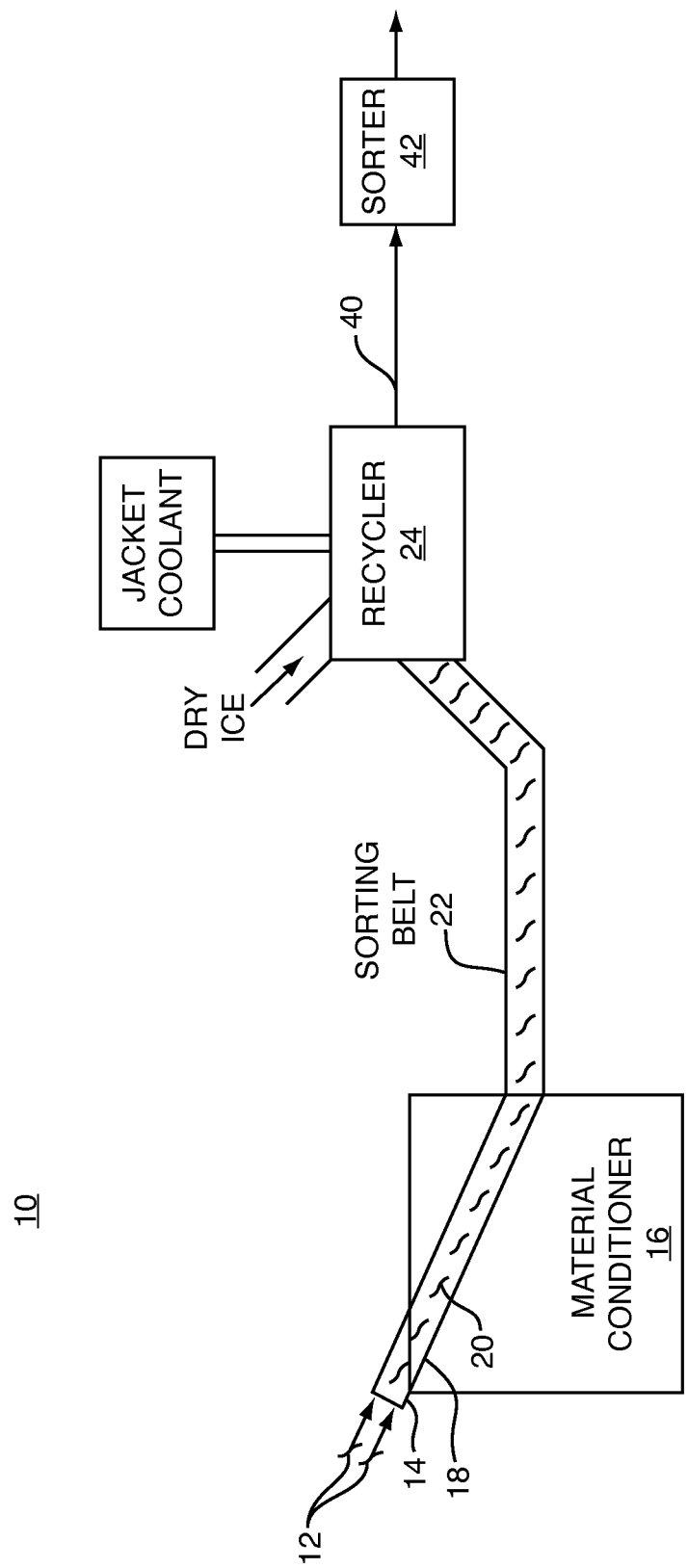
FIG. 1 is a schematic block diagram of an asphalt material recycling system and method according to the present invention.

An asphalt material recycling system and method 10, FIG. 1, according to the present invention is used to recycle asphalt material, such as new and post consumer asphalt (organic and fiberglass based) roof shingles, tar paper, roll roofing, built up roofing and other similar granular or non-granular asphalt coated materials. The granules, fibers or other particles are reduced to a course to fine mesh that can be stored and then reused in the manufacture of new asphalt roofing products, asphalt paving compositions, and other applications.

According to the preferred embodiment of the asphalt material recycling system method of the present invention, and exemplary system 10, FIG. 1 is shown. In this figure, asphalt based products such as manufacturer's asphalt roofing shingle waste and post consumer asphalt shingle waste 12 is provided into a hopper 14 attached to a material conditioner 16. Material conditioner 16 is designed with a belt 18 having a number of teeth 20, which serve to tear apart and separate any bundles or otherwise compacted shingle waste material of either type. Breaking apart this material is important for further recycling.

The shingle waste material 12 to be processed exit for the material conditioner on a sorting belt 22. This stage optionally allows human or mechanical means for removing unwanted debris such as nails, wood, metal or the like. The separation may be done by a magnet or by hand using one or more individuals sorting the material. As presently contemplated, the recycling system will be operated in batch mode and thus, a predetermined amount of waste shingle material 12 will be provided to the material conditioner 16, passed over sorting belt 22 and then inserted into the recycler 24.

Figure 2:
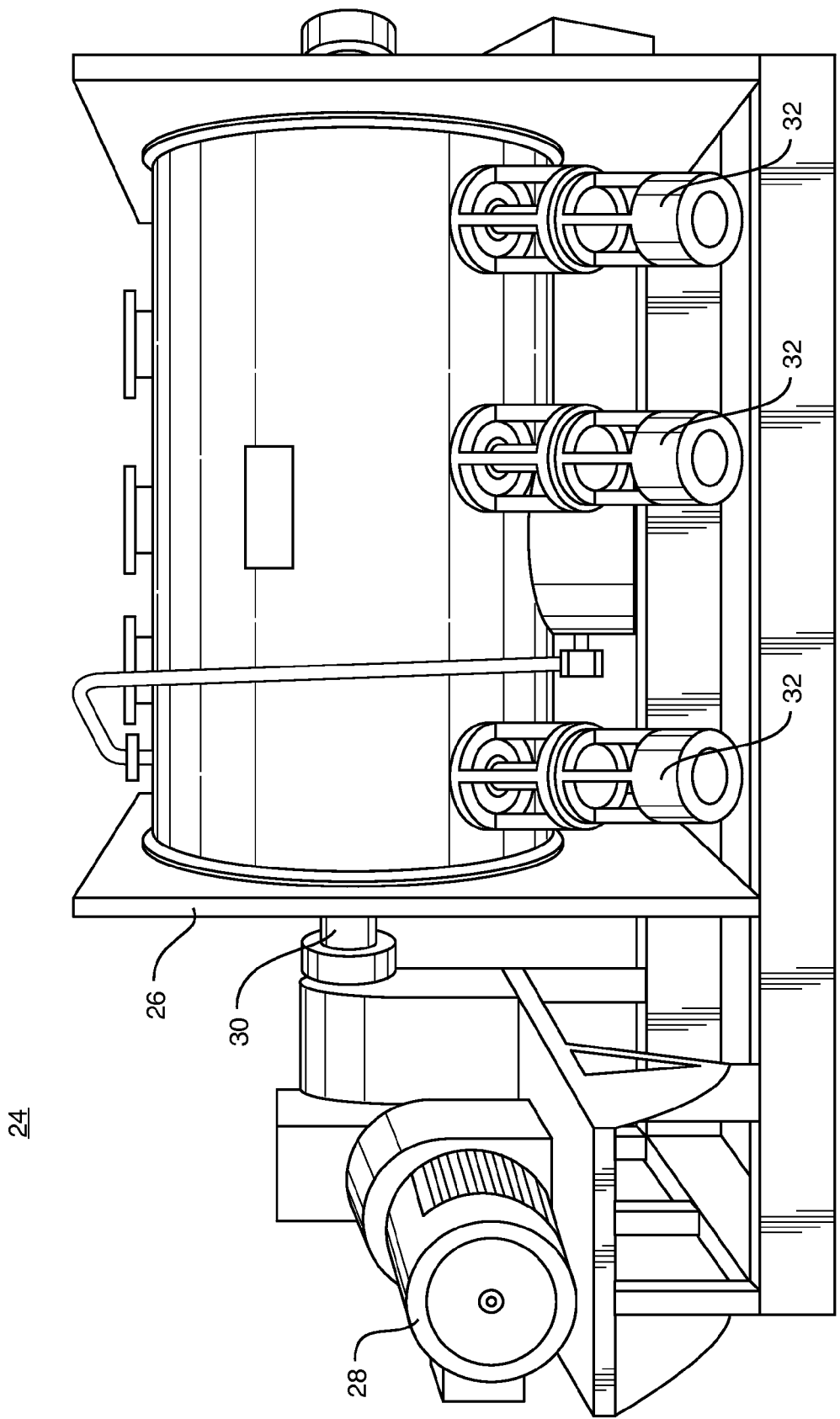
FIG. 2 is a side view of an exemplary mixer apparatus for use in the asphalt recycling system and method according to the preferred embodiment of the present invention.
Figure 3A:
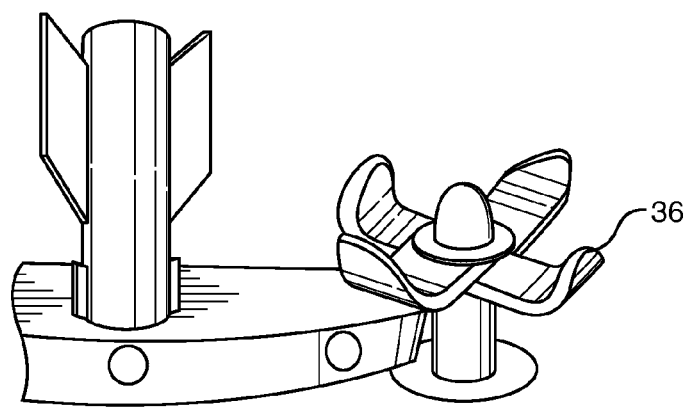
FIGS. 3A-3C our views showing one embodiment of a high-speed chopper including motor and chopper had for use in the exemplary mixer of the asphalt recycling system and method according to the present invention.
Figure 3B:
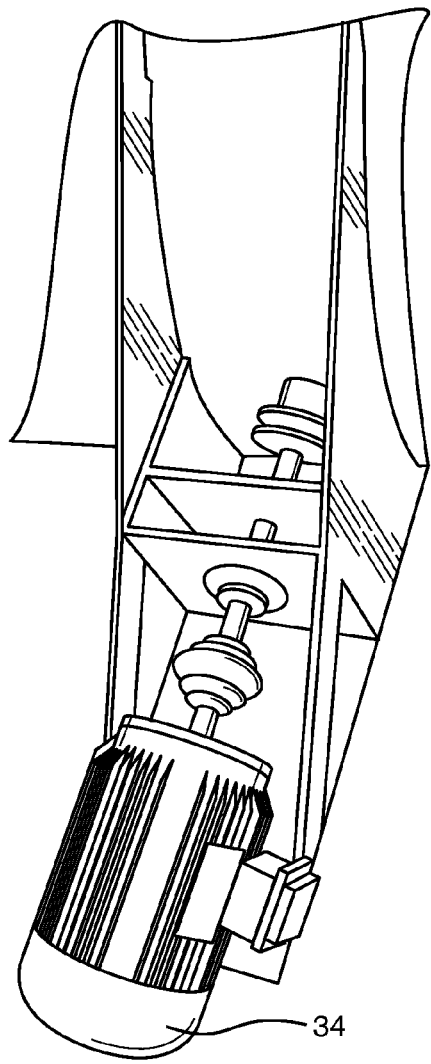
Figure 3C:
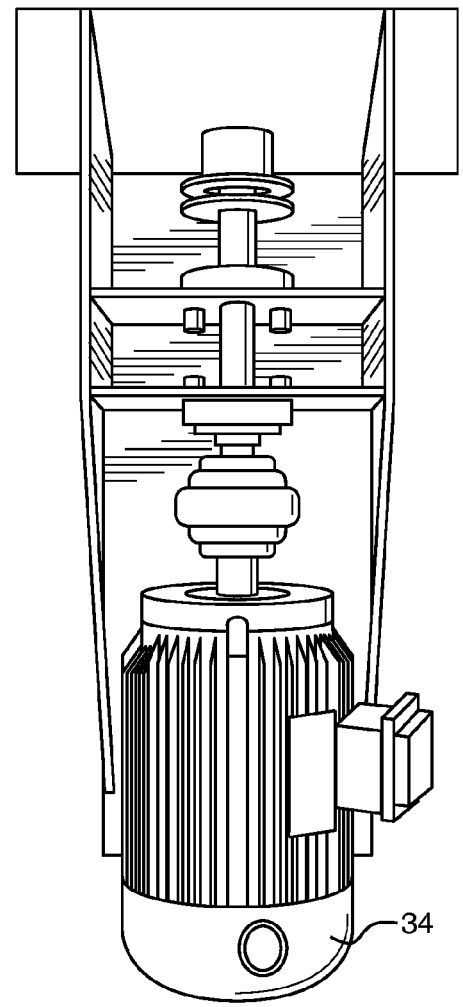
Figure 4:
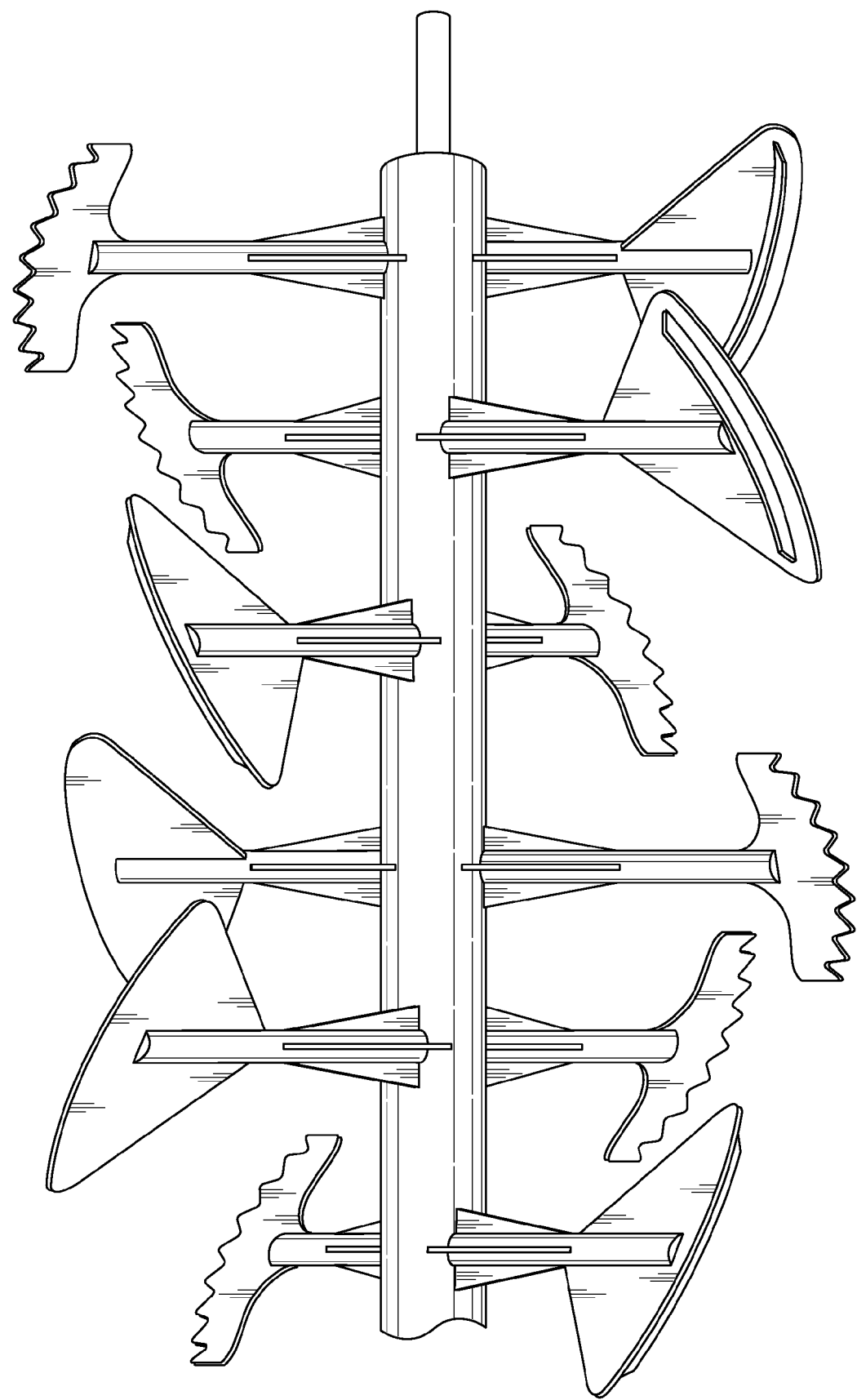
FIG. 4 is a perspective view of a mixing blade used in the mixer in the preferred embodiment of the present invention.

The exemplary recycler 24 available from H.C. Davis Sons Mfg. is shown in greater detail in FIG. 2 and includes a horizontal mixing and grinding chamber or recycling chamber 26 having a first motor 28 which drives a horizontally displaced mixing blade shown in greater detail in FIG. 4 and having a central rod member from which a number of mixing paddles extend; certain paddles with serrated teeth and other paddles which are smooth edged. The mixing paddles extend very near the interior wall of the mixing chamber/to ensure that all material to be recycled within the recycler 24 is picked up and processed. FIG. 3 a shows how the Tulip shaped chopper head 36 (which will be described in greater detail below) is based away from the wall of the recycling chamber while one of the paddles passes very near the wall of the recycling chamber.

The recycler 24 further includes one or more high-speed choppers 32 shown in greater detail in FIG. 3. The one or more high-speed choppers include a motor 34 turning one or more Tulip shaped chopper heads 36. The chopper heads 36 turn at a high RPM and serve to breakup all of the asphalt based material within the recycler 24 to be recycled.

In the preferred embodiment, the recycler 24 is operated in a cool or cooled mode. The recycling chamber 26 is jacketed and 30° cooled glycol cooling liquid is circulated around the jacket and serves to cool the recycling chamber 26. In addition and importantly, dry ice is added to the recycling chamber 26 along with the shingle waste to be recycled. The dry ice serves to drive out any moisture in the material to be recycled and most importantly, makes the material very brittle thus facilitating breaking down the shingle waste by the high-speed choppers and the mixing blade of a horizontal mixer system. Asphalt becomes brittle and shatters at about 35 F, whereas hogger type systems must use brute force to shred the shingles.

Alternatively, the recycler 24 may be operated in a hot or heated mode. In this heated mode, asphalt, oil, wax, polymer or other material may be added to make a slurry suitable to be added to an attritor. The plenum 14 feeding the material conditioner 16 may include choppers or grinders to initially condition or shred the material being input into the recycler 24. The teeth and half plows of the horizontal mixer system keep the unit from jamming even if the bundles are put in whole. The differing distance from the vessel walls along the alternation of serration and plows allows the design to function properly.

Because it is contemplated that the system of the present invention will be operated in batch mode, the recycler 24 will be operated with a predetermined amount of shingle waste material for a predetermined amount of time to achieve a recycled product having the desired coarseness or fineness. The dry ice will evaporate as a gas.

The processed or recycled material, and now in the form of a powder, will be removed from the recycler mechanism 24 as shown generally at 40, FIG. 1 and be provided to a sorter 42. The sorter 42 serves to separate the recycled asphalt powder using a screen or other similar sorting mechanism. The process is designed to separate the particles into the original raw material distribution. This allows the granules (11-16 mesh) to remain intact, while the filler and asphalt "filled coating" (50-250 mesh) is separated out. In the preferred embodiment, the primary separation from the process is at 40-50 mesh, which allows for separation between the bottom mesh size of the surface granule specification and the top mesh size of the filler specification. This preferred separation is also the ideal size for manufacturing other asphalt based products, such as road crack filler, roof cements and roof coatings. As an example, the 200 mesh material can be reused by the asphalt roofing industry because the 200 mesh size complies with the current specification and manufacturing process.

The asphalt dissolves instantly in standard equipment because it is available as a 200 mesh powder and it also coats the granules. This beneficial coating occurs in the recycling machine. The hot mix process consists of heating the asphalt and aggregate separately then mixing them in a pug mill. The pug mill wets out or completely coats the aggregate with asphalt. The asphalt combines the aggregate together like a glue to form the road. This process fully exploits the entrained mix energy and solves the problems that have been observed with attempts to recycle post factory and post consumer shingles.

The industry currently uses ⅜ inch chips and these ⅜ chips will not dissolve in the mixing process, which has caused a major issue in the recycling process. The ⅜ chips have caused a major issue with consistency because the chips are made in a "hogging" process. A massive amount of horsepower is required to rip the shingles to the required size. The shingles are inconsistent as they age and due to the removal from the roof, the hogger process adds to the problem. No attempt can be made to control either the particle size or the percentage of asphalt. Therefore, the new process allows for either solids or asphalts to be readily added back, such that the product will be consistent.

The currently used hogger process uses magnets to remove nails, with only about a 90 percent success rate on ferrous nails and very little success rate with aluminum nails. In order to remove all of the nails to ensure nails are not present in the final material, a two step process is used. The new two step process uses a screen in combination with air classification. This dual process assures that no nails will pass into the final product. Either air or screens also easily separate out the plastic film. It is also important to create an end product that can create a pavement that has minimal voids and air pockets in order to ensure superior quality. The new process easily allows for the percentage of fines to be reduced to at least 12 percent.

The combination of air and screens also serves to separate out the saturated felt fraction. In organic shingles, the saturated felt fraction accounts for 18 percent of the raw material mix. The material is composed of 37 percent asphalt and 63 percent cellulose fibers. The asphalt is mildly oxidized to a melt point of 150 F retaining more of the oil content (other asphalt is oxidized to 235 F) and is not mixed with filler. This asphalt is located in the center of the shingle and has not been degraded by UV exposure. This saturating asphalt is the most valuable component in the shingle and it is inseparable from the cellulose fiber, but this is a positive in applications that require cellulose and asphalt such as roof cements. This fraction of the shingle also has the ability to be stored with only mild agitation. This can be contrasted with "filled coating" with requires significant agitation to keep the dense filler in solution. The saturated felt segment can be stored in the tanks normally used by the paving industry. The saturated felt fraction can also be combusted in oil burning equipment if it is mixed with standard oil and the resulting cellulose becomes a valuable source of energy.

Granules that fall into the 11-50 mesh particle distribution size have been carefully selected by the roofing industry because every void on a roof surface must be filled. A major purpose of granules is to protect the asphalt from UV degradation. The granules are designed for packing and have a very low void volume. These properties make the particles ideal for use in Hot Mix asphalt and cold patch used to repair pot holes.

Particles of a predetermined and appropriate size may be provided to be used in an asphalt mixture for roadways while other particles of another appropriate size may be provided to be reused in making asphalt shingles. Other uses for the recycled asphalt particles are contemplated as well. The recycled asphalt particles may include granular material, which is often placed on top of roofing shingles. The recycled asphalt shingle waste particles may be stored and provided in powder form or alternatively, could be pressed into bricks or briquettes for multiple uses and for ease of storage and shipping.

One of the products that may be produced using the output of the process and method of the present invention are boards. These boards include, in one embodiment, a layer of fiberglass mat on the top and bottom surface with the ground shingles in the center. These boards have a preferred thickness of ¼". This makes a rigid product that has many uses including recover boards, sheathing boards and sound transmission reduction boards.

Recover boards are boards that go in between an old commercial low sloped roof and a new roof. The older roof is left in place. Although recover boards are presently available, the asphalt portion is comprised of virgin asphalt and filler, usually limestone. In accordance with the present invention, the grinding process frees up the fiberglass or other organic fibers, which become reinforcements in the new board. Tall oil may be added and which has a very positive function in the product. It is a natural glue that makes the board much stronger than other prior art products. This is important because the board is the foundation for a new roof. The board is mechanically fastened through the old roof and into the roof deck. The new roof is essentially glued to the top surface of the recover board. Boards can typically be made with one half to two thirds less Tall oil then flux asphalt. Either of these materials is a fuel so less is better.

Another product that can be made from the present invention is sheathing. Commercial buildings usually have a layer of special gypsum board beneath the metal, brick or concrete exterior. The main feature of this product is that it again passes a class A fire rating.

Yet another product that can be made from the present invention is sound board. Asphalt has proven substantial sound transmission reduction properties. Again, a class A fire rating is essential. This product may be used beneath a layer of gypsum on the interior walls of a building.

The present invention is not intended to be limited to a device or method which must satisfy one or more of any stated or implied objects or features of the invention and should not be limited to the preferred, exemplary, or primary embodiment(s) described herein. Modifications and substitutions by one of ordinary skill in the art are considered to be within the scope of the present invention, which is not to be limited except by the allowed claims and their legal equivalents.

The invention claimed is:

1. A system for asphalt recycling, comprising:
   a hopper, configured for receiving asphalt material to be recycled, said hopper coupled to a material conditioner, wherein the material conditioner includes a belt having one or more teeth, wherein the one or more teeth are configured to tear apart and separate said asphalt material to be recycled;
   an asphalt material recycler, coupled to said material conditioner and configured for receiving said asphalt material torn apart and separated by said material conditioner, said asphalt material recycler having a recycling chamber, at least one motor and one or more high-speed choppers, coupled to said at least one motor and located in said recycling chamber, said high speed choppers configured for grinding said asphalt material to be recycled; and
   a sorter, coupled to said asphalt material recycler and configured for separating granules from filler and asphalt filled coating.

2. The system of claim 1, wherein the sorter allows for separation of asphalt at 40-50 mesh.

3. The system of claim 1, wherein said material conditioner further includes a nail removing device for removing nails and other metal objects from said asphalt material to be recycled.

4. The system of claim 1, wherein the system is operated in a batch mode, wherein the batch mode allows the recycler to be operated for a predetermined amount of time based upon the amount of asphalt material to be recycled and a desired coarseness or fineness of a final asphalt product.

5. The system of claim 1, wherein the recycler operates in a cooled mode, whereby the recycling chamber is cooled by a cooling liquid.

6. The system of claim 1, wherein dry ice is added to the recycling chamber during operation.

7. The system of claim 1, wherein the recycler is operated in a heated mode.

8. The system of claim 7, wherein asphalt, oil, wax or polymer is added to the recycler to make a slurry suitable to be added to an attritor.

9. The system of claim 1, wherein the one or more high-speed choppers each include a motor that turns one or more tulip shaped chopper heads that serve to break up the asphalt material within the recycling chamber.

10. The system of claim 1, further comprising a sorting belt, coupled to the material conditioner, wherein the sorting belt allows for human or mechanical removal of unwanted debris from the asphalt material to be recycled prior to the asphalt material being inserted into the recycler.

11. The system of claim 1, wherein the asphalt material to be recycled is selected from the group consisting of roofing shingle, tar paper, roll roofing, built up roofing and other granular or non-granular asphalt coated material.

12. The system of claim 1, wherein an asphalt output material of the sorter is configured to be used in new asphalt products, roofing shingles or asphalt paving compositions.

* * * * *